United States Patent
Teragaito et al.

(10) Patent No.: US 10,226,833 B2
(45) Date of Patent: Mar. 12, 2019

(54) WELDING GUN

(71) Applicant: HONDA MOTOR CO., LTD., Tokyo (JP)

(72) Inventors: Yohei Teragaito, Tochigi-ken (JP); Hiroshi Miwa, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 15/305,898

(22) PCT Filed: Apr. 24, 2014

(86) PCT No.: PCT/JP2014/061508
§ 371 (c)(1),
(2) Date: Oct. 21, 2016

(87) PCT Pub. No.: WO2015/162742
PCT Pub. Date: Oct. 29, 2015

(65) Prior Publication Data
US 2017/0043427 A1 Feb. 16, 2017

(51) Int. Cl.
*B23K 11/11* (2006.01)

(52) U.S. Cl.
CPC .............. *B23K 11/115* (2013.01); *B23K 11/11* (2013.01)

(58) Field of Classification Search
CPC ................... B23K 11/11; B23K 11/115; Y10T 403/32557; Y10T 403/32581; Y10T 403/32861; F16C 11/045
USPC ....................... 403/113, 116, 150; 219/86.25
See application file for complete search history.

(56) References Cited

U.S. PATENT DOCUMENTS

2012/0031887 A1 2/2012 Matsumoto et al.

FOREIGN PATENT DOCUMENTS

JP 58-023492 Y2 5/1983
JP 2012-035274 A 2/2012

OTHER PUBLICATIONS

International Search Report (PCT/ISA/210) issued in PCT/JP2014/061508, dated Jul. 22, 2014.

*Primary Examiner* — Dana Ross
*Assistant Examiner* — James F Sims, III
(74) *Attorney, Agent, or Firm* — Birch, Stewart, Kolasch & Birch, LLP

(57) ABSTRACT

A welding gun equipped with a retaining unit, which includes a first retaining member and a second retaining member, and retains a stationary gun arm and a movable gun arm. A retaining hole for retaining the stationary gun arm, guide grooves for insertion of rolling members provided on an arm holder that retains the movable gun arm, connecting member insertion holes into which connecting members connecting the first retaining member and the second retaining member are inserted, and a retained member insertion hole for inserting a retained member retained by a moving member that moves the retaining unit to a welding operation location, are formed in the first retaining member and the second retaining member, and the regions where these components are formed are set as thick-walled regions having a greater thickness than other regions. Thus, adequate rigidity is ensured while avoiding an increase in weight.

2 Claims, 5 Drawing Sheets

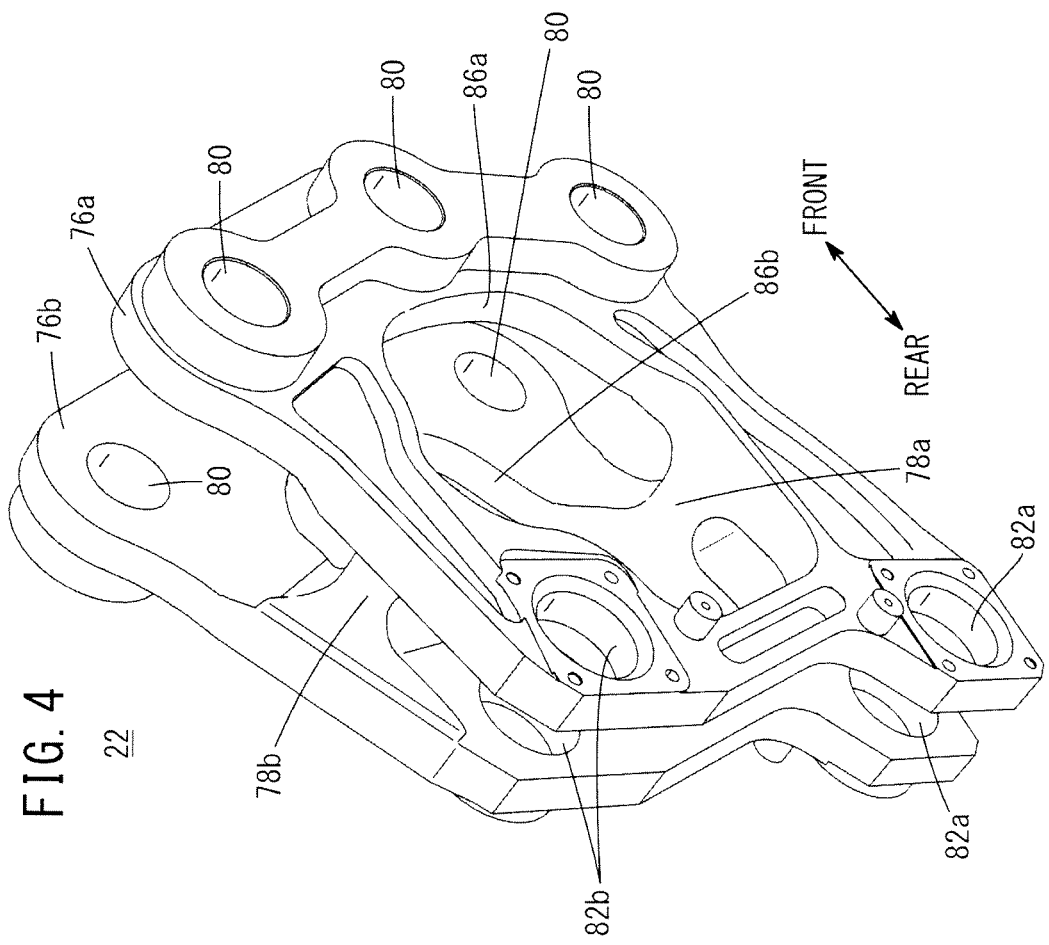

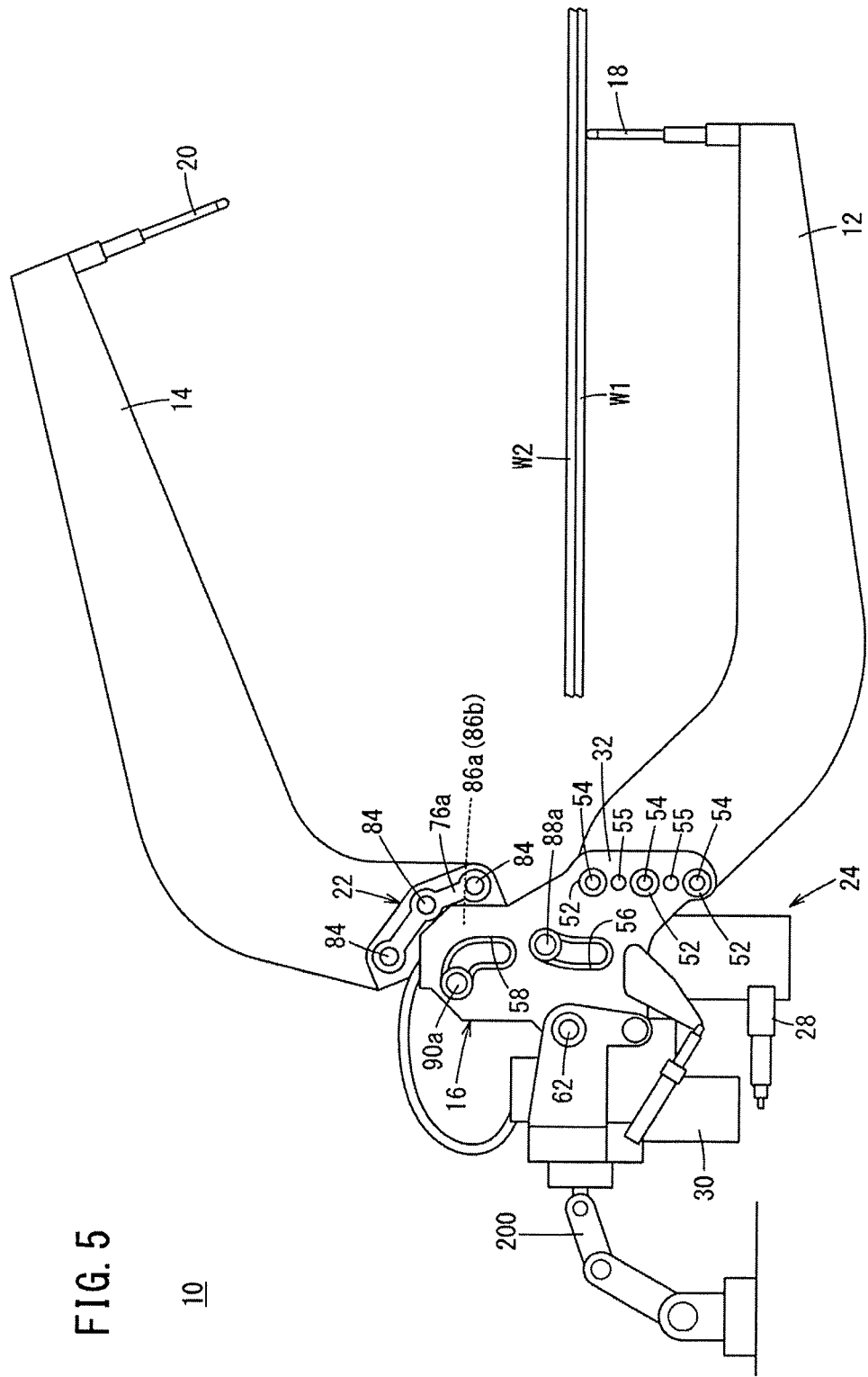

WELDING GUN

TECHNICAL FIELD

The present invention relates to a welding gun having a stationary gun arm, and a movable gun arm that is capable of approaching toward and moving away from the stationary gun arm.

BACKGROUND ART

A welding gun includes a stationary gun arm and a movable gun arm on which electrode tips are provided on respective distal ends thereof. The movable gun arm is capable of approaching toward and moving away from the stationary gun arm under an action of a motor and a ball screw or the like, and an opening and closing operation is carried out by such separation from and approaching toward the stationary gun arm.

More specifically, the stationary gun arm is retained in a positioned and fixed state by a retaining unit in which guide grooves are formed. On the other hand, the movable gun arm is retained in the retaining unit through an arm holder. Rollers are disposed on the arm holder, and the rollers are inserted slidably in the guide grooves that are formed in the retaining unit. Thus, accompanying the motor being energized and the ball screw starting to undertake a rotating operation, the arm holder swings together with the rollers sliding inside the guide grooves. As a result, the movable gun arm swings. In addition, when the movable gun arm approaches toward the stationary gun arm, the electrode tips face toward one another and welding is carried out with respect to a member to be welded.

In relation to the aforementioned structure and operations, detailed descriptions thereof are given in Japanese Utility Model Publication No. 58-023492 and Japanese Laid-Open Patent Publication No. 2012-035274.

SUMMARY OF INVENTION

Incidentally, when the member to be welded occupies a large surface area, and welding is performed in the center or in the vicinity of the center, it is necessary for the stationary gun arm and the movable gun arm to be elongated. This is because, if the stationary gun arm and the movable gun arm are short in length, it becomes difficult for the electrode tips to reach the welding location. Further, in certain cases, the member to be welded also interferes with the retaining unit.

The weights of the elongated stationary gun arm and movable gun arm are large. Consequently, it is necessary for the retaining unit to be of high rigidity corresponding to the large load that is received from the stationary gun arm and the movable gun arm. Therefore, although it can be considered to make the retaining unit thick-walled, in this case, the retaining unit also increases in weight.

In general, the welding gun is disposed on a transport apparatus (moving device) such as a robot or the like. If the weights of the stationary gun arm, the movable gun arm, and the retaining unit are large as discussed above, the load that acts on the robot or the like becomes large as well. As a result, it is considered to be necessary to increase the size and scale of the robot so as to be capable of moving such a large weight welding gun to a welding location.

As noted above, in order to perform welding of an member to be welded having a large surface area, not only is it necessary to replace the stationary gun arm and the movable gun arm with elongated ones, but cases occur in which it also is necessary to replace the transport apparatus that moves the welding gun with one that is capable of corresponding to a sufficient load. In this case, capital investments in equipment expenditures tend to rise excessively.

A general object of the present invention is to provide a welding gun having a retaining unit for which a sufficient rigidity is assured while avoiding an increase in weight.

A principal object of the present invention is to provide a welding gun capable of corresponding to a heavy gun arm with an elongated dimension.

Another object of the present invention is to provide a welding gun having superior versatility.

According to an embodiment of the present invention, a welding gun is provided, which is equipped with a retaining unit that retains a stationary gun arm, and a movable gun arm configured to approach toward and separate away from the stationary gun arm, wherein:

the retaining unit comprises a first retaining member and a second retaining member sandwiching an arm holder therebetween, the arm holder configured to retain the movable gun arm;

in each of the first retaining member and the second retaining member along a thickness direction thereof, there are formed retaining holes configured to retain the stationary gun arm, a guide groove in which rolling members provided on the arm holder are inserted, connecting member insertion holes in which connecting members configured to connect the first retaining member and the second retaining member are inserted, and a retained member insertion hole in which a retained member is inserted, the retained member retained by a moving device configured to move the retaining unit to a welding operation location;

regions where the retaining holes, the guide groove, the connecting member insertion holes, and the retained member insertion hole are formed are thick-walled regions having a greater thickness than other regions; and at least two of the connecting member insertion holes are formed so as to sandwich the guide groove therebetween, together with the connecting member that is inserted into one of the connecting member insertion holes passing through a through hole that is formed to penetrate along a thickness direction of the arm holder.

In the foregoing manner, according to the present invention, only those regions on which large loads act are thick-walled, and therefore, the rigidity of such regions can be assured. In addition, when loads act on the retaining unit, the connecting members that connect the first retaining member and the second retaining member bear a portion of the load. More specifically, the load is distributed. This feature as well also contributes to ensuring rigidity. For this reason, adequate durability is expressed in the retaining unit.

Further, regions other than the thick-walled regions of the first retaining member and the second retaining member are thin-walled. In addition, a through hole is formed in the arm holder. Therefore, it is possible for the retaining unit to be made lighter in weight.

Ultimately, according to the present invention, sufficient rigidity of the retaining unit can be assured while avoiding an increase in weight of the retaining unit. Consequently, even if the stationary gun arm and the movable gun arm are elongated and increased in weight, the stationary gun arm and the movable gun arm can easily be retained. Stated otherwise, it is possible to cope with these types of gun arms.

Further, in the retaining unit, since rigidity can be assured commensurate with retention of the elongated and large weight stationary gun arm and movable gun arm, it is easily possible to retain a short-dimensioned stationary gun arm and movable gun arm. That is, various types of gun arms can suitably be exchanged. Stated otherwise, the welding gun is superior in versatility.

In addition, since an increase in the weight of the retaining unit is avoided, as the moving device (a transport apparatus such as a robot or the like) used for moving the welding gun, a small scale moving device can be adopted. Therefore, a rise in capital investments in equipment expenditures is avoided.

Further, as described above, the connecting members pass through the through hole of the arm holder. Therefore, when the arm holder swings in order to swing the movable gun arm, interference with the arm holder is prevented. Stated otherwise, the connecting member does not interfere with swinging of the arm holder and the movable gun arm.

The thick-walled regions can be disposed continuously over the retaining holes, the guide groove, and the connecting member insertion holes. In this case, formation of the thick-walled regions can easily be realized.

BRIEF DESCRIPTION OF DRAWINGS

FIG. 4 is a schematic overall perspective view of the arm holder; and

FIG. 5 is a side view of main components at a time that the welding gun is in an opened state.

DESCRIPTION OF EMBODIMENTS

A preferred embodiment of a welding gun according to the present invention will be described in detail below with reference to the accompanying drawings.

Figure 1:
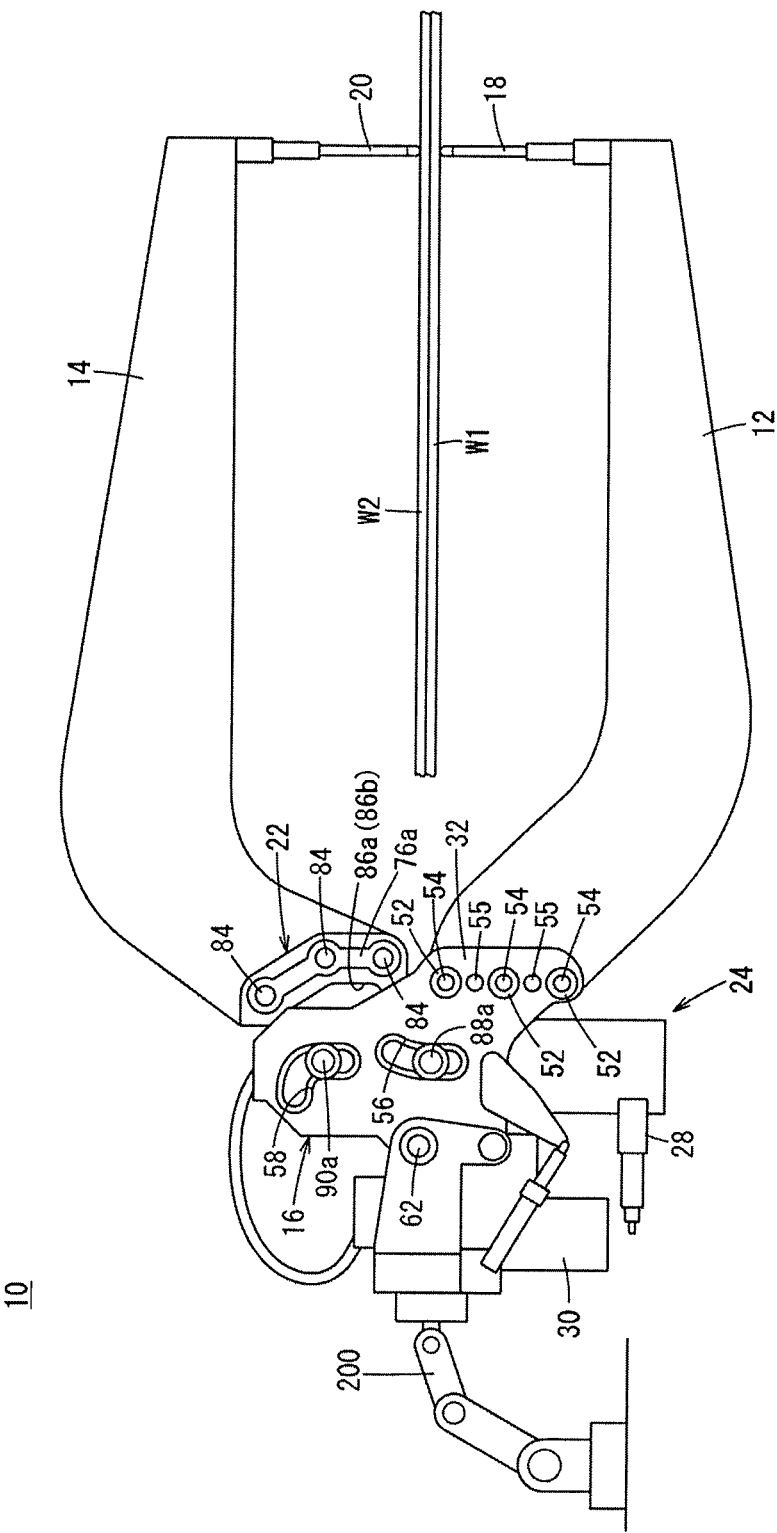
FIG. 1 is a side view of main components at a time that a welding gun according to an embodiment of the present invention is in a closed state.

FIG. 1 is a side view of essential components at a time that a welding gun 10 according to an embodiment of the present invention is in a closed state. The welding gun 10 is equipped with a stationary gun arm 12, a movable gun arm 14, and a retaining unit 16 in which the stationary gun arm 12 and the movable gun arm 14 are retained. The retaining unit 16 is held on a distal end arm of a robot 200 as a moving means for moving the welding gun 10. Stated otherwise, the welding gun 10 is disposed on a robot, and by carrying out suitable rotational movement of various arms of the robot, the stationary gun arm 12 and the movable gun arm 14 are moved to positions to sandwich stacked members to be welded W1, W2 therebetween. More specifically, the robot serves as a moving means for moving (transporting) the welding gun 10 to a predetermined welding operation location.

In this case, the stationary gun arm 12 and the movable gun arm 14 are relatively long in length. Consequently, even in the case that the members to be welded W1, W2 are of a large surface area, it is possible for center portions of the members to be welded W1, W2 or portions in the vicinity thereof to be sandwiched and gripped by a first electrode tip 18 and a second electrode tip 20 provided on respective distal ends of the gun arms.

The stationary gun arm 12 is retained directly by the retaining unit 16, whereas the movable gun arm 14 is retained indirectly on the retaining unit 16 through an arm holder 22. This point will be discussed in further detail later.

Downwardly of the retaining unit 16, a swing unit 24 is arranged having a non-illustrated servo motor and ball screw. The swing unit 24 further includes a non-illustrated rod that enters into the arm holder 22. Rotational motion of the servomotor is converted into reciprocal motion (vertical motion) of the rod in the axial direction through the ball screw.

Figure 2:
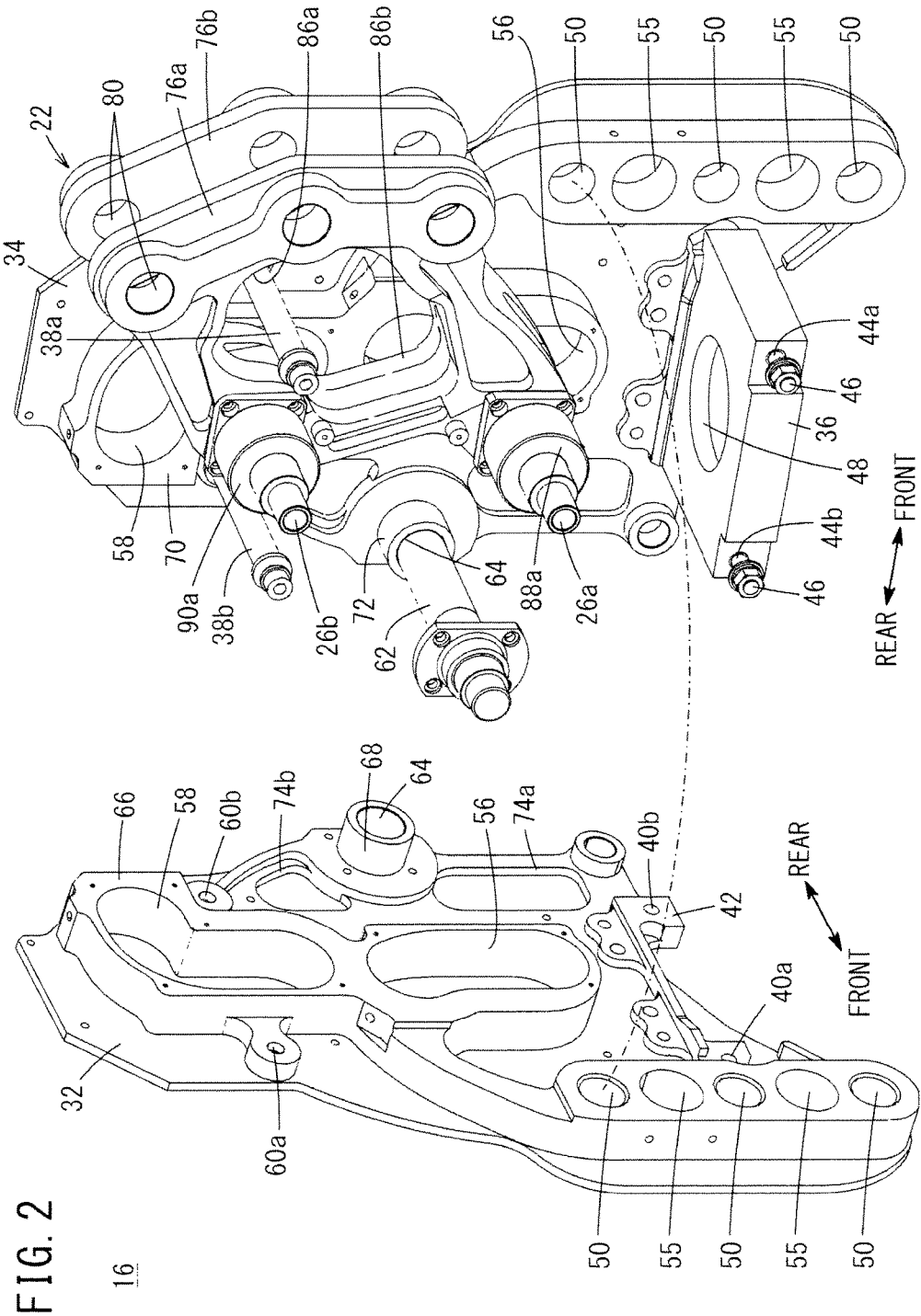
FIG. 2 is an exploded perspective view in regard to a retaining unit that constitutes part of the welding gun, in which the arm holder is shown to be supported on the side of a second retaining member.
Figure 3:
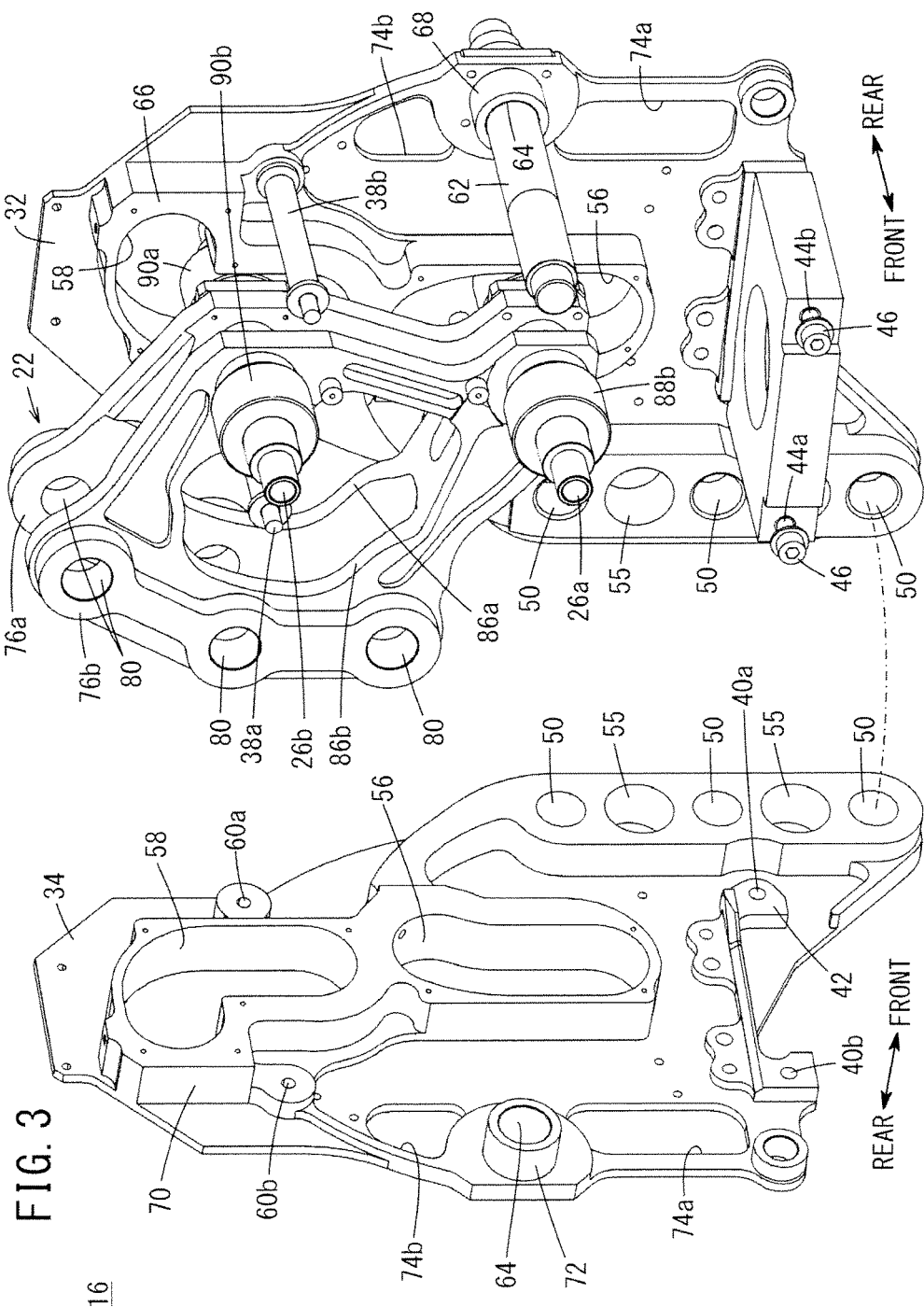
FIG. 3 is an exploded perspective view in regard to the retaining unit, in which the arm holder is shown to be supported on the side of a first retaining member.

The rod is connected to a first roller retaining shaft 26a that is disposed on the arm holder 22 (see FIGS. 2 and 3). Thus, the arm holder 22 swings accompanying advancing and retracting movements of the rod.

An encoder 28 is provided on the swing unit 24. The angle of rotation of the servo motor is detected by the encoder 28. Further, in the vicinity of the swing unit 24, a transformer 30 is provided for energizing a welding current between the first electrode tip 18 and the second electrode tip 20, which are disposed on the respective distal ends of the stationary gun arm 12 and the movable gun arm 14.

To explain in greater detail concerning the retaining unit 16, as shown in FIGS. 2 and 3, the retaining unit 16 is constituted by connecting together a first retaining member 32 and a second retaining member 34 through a closing plate 36, and through a first connecting pin 38a and a second connecting pin 38b (connecting members). More specifically, the closing plate 36 connects a lower side of the first retaining member 32 and the second retaining member 34, and the first connecting pin 38a and the second connecting pin 38b connect an upper side thereof. In the following, to facilitate explanation, the same reference characters will be designated with respect to the same structural elements appearing in the first retaining member 32 and the second retaining member 34.

On lower ends of the main body portions of the first retaining member 32 and the second retaining member 34, a first tie rod insertion hole 40a, and a second tie rod insertion hole 40b are formed to penetrate therethrough respectively. On a surface (inner wall) of the first retaining member 32 on a side thereof facing toward the second retaining member 34, regions in the vicinity of the first tie rod insertion hole 40a and the second tie rod insertion hole 40b are provided in the form of thick-walled stepped portions 42. Similarly, on a surface (inner wall) of the second retaining member 34 on a side thereof facing toward the first retaining member 32, regions in the vicinity of the first tie rod insertion hole 40a and the second tie rod insertion hole 40b are provided in the form of stepped portions 42.

The closing plate 36 is of a cross-like shape in which cutout portions are formed in each of the four corners of a square shape as viewed in plan. The stepped portions 42 are inserted into the cutout portions that are formed in this manner. Furthermore, in the closing plate 36, a third tie rod insertion hole 44a, which is interposed between each of the first tie rod insertion holes 40a, 40a, and a fourth tie rod insertion hole 44b, which is interposed between each of the second tie rod insertion holes 40b, 40b, are formed to penetrate therethrough. More specifically, the third tie rod insertion hole 44a and the fourth tie rod insertion hole 44b extend from the first retaining member 32 to the second retaining member 34.

A tie rod 46 is passed through the first tie rod insertion hole 40a of the first retaining member 32, the third tie rod insertion hole 44a of the closing plate 36, and the first tie rod insertion hole 40a of the second retaining member 34.

Similarly, a tie rod 46 also is passed through the second tie rod insertion hole 40b of the first retaining member 32, the fourth tie rod insertion hole 44b of the closing plate 36, and the second tie rod insertion hole 40b of the second retaining member 34. Nuts are screw-engaged with threaded portions of the tie rods 46 which are exposed on outer wall plate sides from the first tie rod insertion hole 40a and the second tie rod insertion hole 40b of the second retaining member 34.

The closing plate 36 serves to close a clearance on the lower side of the first retaining member 32 and the second retaining member 34. A round hole 48 is formed to penetrate in a vertical direction through the closing plate 36. The aforementioned rod is passed through the round hole 48.

In the first retaining member 32 and the second retaining member 34, respectively, a plurality of individual bolt holes (retaining holes) 50 are formed in a penetrating manner in a front end portion (the right end in FIG. 1) that projects slightly from the main body portion. On the other hand, non-illustrated bolt insertion holes are formed to penetrate in a base end portion of the stationary gun arm 12. The stationary gun arm 12 is retained in the retaining unit 16 by screw-engagement of nuts 54 onto bolts 52 (see FIG. 1), which are inserted through the bolt holes 50 of the first retaining member 32 or the second retaining member 34, and through bolt insertion holes of the stationary gun arm 12, and further are exposed from the bolt holes 50 of the second retaining member 34 or the first retaining member 32.

Between each of the bolt holes 50, 50, through-windows 55 are formed in a penetrating manner with the aim of reducing the weight of the first retaining member 32 and the second retaining member 34. Instead of the through-windows 55, bottomed concavities may be formed. Further, the through-windows 55 may serve as bolt holes, and tightening may be carried out by way of bolts and nuts that are used therein.

As shown in FIGS. 2 and 3, in the main body portions of the first retaining member 32 and the second retaining member 34, first guide grooves 56, which are slightly bent midway therein from the lower side to the upper side, and second guide grooves 58, which are bent from a location upwardly of the first guide grooves 56 to rear side end portions (the left end in FIG. 1), are formed in a penetrating manner.

In addition, at a front side and rear side (right and left) of the second guide grooves 58, and more specifically, at positions sandwiching the second guide grooves 58 therebetween, first connecting pin holes 60a and second connecting pin holes 60b are formed penetratingly as insertion holes. The first connecting pin 38a is fitted into the first connecting pin holes 60a, and further, the second connecting pin 38b is fitted into the second connecting pin holes 60b.

On rear end portions (the left end in FIG. 1) of the first retaining member 32 and the second retaining member 34, shaft insertion holes 64 are formed for insertion therein of an equalizer shaft 62. The distal end arm of the robot is connected to the equalizer shaft 62. More specifically, the equalizer shaft 62 is a retained member that is retained by the robot, and the shaft insertion holes 64 serve as retained member insertion holes.

In the above-described structure, the bolt holes 50, the through-windows 55, the first guide grooves 56, the second guide grooves 58, the first connecting pin holes 60a, the second connecting pin holes 60b, and the shaft insertion holes 64 extend along the thickness direction of the first retaining member 32 and the second retaining member 34. In addition, on the surfaces (inner walls) of the first retaining member 32 facing toward the second retaining member 34, the thicknesses of regions disposed continuously over the bolt holes 50, the through-windows 55, the first guide grooves 56, the second guide grooves 58, the first connecting pin holes 60a, and the second connecting pin holes 60b, as well as the thicknesses of regions in the vicinity of the shaft insertion holes 64 are set to be greater in comparison with the thickness of other regions. More specifically, on the first retaining member 32, a first thick-walled region 66 and a second thick-walled region 68 are provided so that portions of the inner wall project out therefrom.

Similarly, on the surfaces (inner walls) of the second retaining member 34 facing toward the first retaining member 32, the thicknesses of regions disposed continuously over the bolt holes 50, the through-windows 55, the first guide grooves 56, the second guide grooves 58, the first connecting pin holes 60a, and the second connecting pin holes 60b, as well as the thicknesses of regions in the vicinity of the shaft insertion holes 64 are set to be greater in comparison with the thickness of other regions. In accordance therewith, on the second retaining member 34, a third thick-walled region 70 and a fourth thick-walled region 72 are provided so that portions of the inner wall project out therefrom.

Moreover, reference numerals 74a and 74b indicate through holes (so-called undercuts or cutouts), which are formed to penetrate through in the thickness direction of the first retaining member 32 and the second retaining member 34 in order to reduce the weight thereof.

As shown in FIG. 4, the arm holder 22 is a single member that is connected integrally via a first bridge portion 78a and a second bridge portion 78b, which are bridged across between a first clamping section 76a and a second clamping section 76b. On front ends of the first clamping section 76a and the second clamping section 76b, a plurality of (in this case, three) bolt holes 80 are formed, whereas on a rear end lower side and a rear end upper side thereof, first shaft holes 82a and second shaft holes 82b are formed respectively.

The movable gun arm 14 (see FIG. 1) is inserted between both front end portions of the first clamping section 76a and the second clamping section 76b. Non-illustrated bolt insertion holes are formed on a base end portion of the movable gun arm 14. The movable gun arm 14 is retained in the arm holder 22 by screw-engagement of nuts onto bolts 84 (see FIG. 1), which are inserted through the bolt holes 80 of the first clamping section 76a or the second clamping section 76b, and through bolt insertion holes of the movable gun arm 14, and further are exposed from the bolt holes 80 of the second clamping section 76b or the first clamping section 76a.

The first clamping section 76a and the second clamping section 76b are formed in annular shapes having a predetermined thickness, and therefore, respective large-sized through openings 86a, 86b (through holes) are formed therein. As shown in FIGS. 2 and 3, the first connecting pin 38a passes through the through openings 86a, 86b, and is fitted respectively into the first connecting pin holes 60a. In this manner, in the welding gun 10 according to the present embodiment, the through openings 86a, 86b are formed in the arm holder 22, and together therewith, the first connecting pin 38a passes through the through openings 86a, 86b. Therefore, the first connecting pin 38a does not interfere with the arm holder 22.

Further, because the through openings 86a, 86b are formed, a contribution is made to reducing the weight of the arm holder 22, and hence the weight of the welding gun 10.

The first roller retaining shaft 26a and a second roller retaining shaft 26b are passed through the first shaft holes 82*a* and the second shaft holes 82*b*, and are capable of rotating therein. On the first roller retaining shaft 26*a*, on opposite ends thereof that project out from the first shaft holes 82*a*, a first roller 88*a* and a second roller 88*b* are disposed respectively. The first roller 88*a* and the second roller 88*b* rotate in following relation with rotation of the first roller retaining shaft 26*a*.

Further, on the second roller retaining shaft 26*b*, on opposite ends thereof that project out from the second shaft holes 82*b*, a third roller 90*a* and a fourth roller 90*b* are disposed respectively. The third roller 90*a* and the fourth roller 90*b* rotate in following relation with rotation of the second roller retaining shaft 26*b*. All of the first roller 88*a*, the second roller 88*b*, the third roller 90*a*, and the fourth roller 90*b* are roller members.

The first roller 88*a* is inserted into the first guide groove 56 of the first retaining member 32, and the second roller 88*b* is inserted into the first guide groove 56 of the second retaining member 34. Further, the third roller 90*a* is inserted into the second guide groove 58 of the first retaining member 32, and the fourth roller 90*b* is inserted into the second guide groove 58 of the second retaining member 34. Consequently, the arm holder 22 is retained in the retaining unit 16 in a state of being sandwiched between the first retaining member 32 and the second retaining member 34. Further, the movable gun arm 14, which is retained by the arm holder 22, is retained indirectly in the retaining unit 16.

The welding gun 10 according to the present invention is constituted basically as described above. Next, operations and advantageous effects of the welding gun 10 will be described.

The stationary gun arm 12 is retained in the retaining unit 16 by screw-engagement of the nuts 54 onto the bolts 52 (see FIG. 1), which are inserted through the bolt holes 50 of the first retaining member 32 (or the second retaining member 34), and through bolt insertion holes in the base end portion of the stationary gun arm 12, and further are passed through the bolt holes 50 of the second retaining member 34 (or the first retaining member 32). Since the stationary gun arm 12 is relatively long in length, and the region thereof attached to the retaining unit 16 serves as the base end portion, the center of gravity of the stationary gun arm 12 is distanced significantly from the retaining unit 16. In addition, since the stationary gun arm 12 is elongated, the weight thereof is relatively large. Thus, in the first retaining member 32 and the second retaining member 34, a large load acts on regions in the vicinity of the bolt holes 50 (and the through-windows 55).

Further, the movable gun arm 14 is connected to the arm holder 22 by screw-engagement of nuts onto the bolts 84 (see FIG. 1), which are inserted through the bolt holes 80 of the first clamping section 76*a* (or the second clamping section 76*b*) of the arm holder 22, and through bolt insertion holes of the movable gun arm 14, and further are passed through the bolt holes 80 of the second clamping section 76*b* (or the first clamping section 76*a*) of the arm holder 22. The first roller retaining shaft 26*a* and the second roller retaining shaft 26*b* are passed through the first shaft holes 82*a* and the second shaft holes 82*b* of the arm holder 22, and furthermore, the first roller 88*a* and the second roller 88*b*, which are attached to opposite ends of the first roller retaining shaft 26*a*, are inserted into the first guide grooves 56, together with the third roller 90*a* and the fourth roller 90*b*, which are attached to opposite ends of the second roller retaining shaft 26*b*, being inserted into the second guide grooves 58. In the foregoing manner, the movable gun arm 14 is retained indirectly in the retaining unit 16 through the arm holder 22.

Since the movable gun arm 14 also is relatively long in length, and the region thereof attached to the arm holder 22 (i.e., the region retained indirectly by the retaining unit 16) serves as a base end portion, the center of gravity of the movable gun arm 14 is distanced significantly from the retaining unit 16. In addition, since the movable gun arm 14 is elongated, the weight thereof is relatively large. Thus, in the first retaining member 32 and the second retaining member 34, a large load acts on regions in the vicinity of the first guide groove 56 and the second guide groove 58.

Furthermore, a distal end arm of the robot is connected to the equalizer shaft 62 that is inserted into the shaft insertion holes 64. At a time that the respective arms rotate, for example, and the welding gun 10 is oriented downward, a load due to the weight of the welding gun 10 itself acts in the vicinity of the shaft insertion holes 64.

In this regard, on the surface (inner wall) of the first retaining member 32 facing toward the second retaining member 34, the first thick-walled region 66 is disposed continuously over the bolt holes 50, the through-windows 55, the first guide groove 56, the second guide groove 58, the first connecting pin hole 60*a*, and the second connecting pin hole 60*b*, and together therewith, the second thick-walled region 68 is disposed in the vicinity of the shaft insertion hole 64. Similarly, on the surface (inner wall) of the second retaining member 34 facing toward the first retaining member 32, the third thick-walled region 70 is disposed continuously over the bolt holes 50, the through-windows 55, the first guide groove 56, the second guide groove 58, the first connecting pin hole 60*a*, and the second connecting pin hole 60*b*, and together therewith, the fourth thick-walled region 72 is disposed in the vicinity of the shaft insertion hole 64.

More specifically, in the first retaining member 32 and the second retaining member 34, the thicknesses of regions thereof on which large loads act are set to be greater in comparison with that of other regions. Therefore, the rigidity of such regions can be assured. Consequently, the retaining unit 16 exhibits sufficient durability with respect to large loads.

In addition, the first retaining member 32 and the second retaining member 34 are connected through the first connecting pin 38*a* and the second connecting pin 38*b*, which are disposed at positions sandwiching the second guide grooves 58. The first connecting pin 38*a* and the second connecting pin 38*b* bear a portion of the load that acts on the retaining unit 16. More specifically, the load is distributed. This feature as well contributes to enhancing the durability of the retaining unit 16.

Moreover, the first thick-walled region 66 and the third thick-walled region 70 are formed continuously around the first connecting pin hole 60*a* in which the first connecting pin 38*a* is inserted, and the second connecting pin hole 60*b* in which the second connecting pin 38*b* is inserted, as described above. Consequently, the periphery around the first connecting pin hole 60*a* and the second connecting pin hole 60*b* exhibits adequate rigidity. Stated otherwise, in the area around the first connecting pin hole 60*a* and the second connecting pin hole 60*b*, suitable durability is expressed.

On the other hand, regions apart from the first thick-walled region 66, the second thick-walled region 68, the third thick-walled region 70, and the fourth thick-walled region 72 are set to be thin-walled. Consequently, an increase in the weights of the first retaining member 32 and the second retaining member 34, and by consequence an increase in the weight of the retaining unit 16, can be avoided.

As described above, according to the present embodiment, the welding gun 10 having the retaining unit 16 for which an increase in weight thereof is suppressed can be constituted while ensuring rigidity. Consequently, as the robot that moves (transports) the welding gun 10 toward the members to be welded W1, W2, a small scaled robot can be selected. In other words, there is no need to replace the robot with one that is larger in size. Thus, a rise in capital investments in equipment expenditures can be avoided.

The robot brings about the opened state of the welding gun 10 shown in FIG. 5, i.e., a state in which the movable gun arm 14 is separated away from the stationary gun arm 12. Then, the robot moves the welding gun 10 through the equalizer shaft 62, and the distal end arm of the robot is stopped at a position where the members to be welded W1, W2 are interposed between the stationary gun arm 12 and the movable gun arm 14. When stopped in this manner, because the stationary gun arm 12 and the movable gun arm 14 are elongated and large in weight, an inertial force acts therein, and the distal end arm vibrates slightly after being stopped. Such a vibration also imposes a load that acts on the retaining unit 16.

However, as described above, the first thick-walled region 66 and the second thick-walled region 68 are provided on the inner wall of the first retaining member 32, and the third thick-walled region 70 and the fourth thick-walled region 72 are provided on the inner wall of the second retaining member 34. In addition, the first connecting pin 38a and the second connecting pin 38b are bridged between the first retaining member 32 and the second retaining member 34. Therefore, in this case as well, the first retaining member 32 and the second retaining member 34 exhibit sufficient durability.

At this point in time, the first electrode tip 18 is placed in abutment against the lower surface of the member to be welded W1. Thereafter, together with the servo motor being energized, rotational motion of the servo motor is converted into rearward (descending) movement of the rod in the axial direction through the ball screw.

Along therewith, the first roller retaining shaft 26a to which the rod is connected is drawn downwardly. As a result, the arm holder 22 is swung so as to face downward, and in following relation, the movable gun arm 14 approaches toward the stationary gun arm 12. At this time, the first roller 88a and the second roller 88b move downwardly while being guided within the first guide grooves 56, and together therewith, the third roller 90a and the fourth roller 90b move downwardly while being guided within the second guide grooves 58.

Finally, the second electrode tip 20 provided on the distal end of the movable gun arm 14 abuts against the upper surface of the member to be welded W2. More specifically, the welding gun 10 assumes the closed state shown in FIG. 1.

During this time, the angle of rotation of the servo motor is detected by the encoder 28. When the angle of rotation reaches a preset angle, or more specifically, when the movable gun arm 14 is swung at a predetermined angle, the servo motor and the ball screw are stopped.

The first connecting pin 38a passes through the through openings 86a, 86b of the first clamping section 76a and the second clamping section 76b. Therefore, the first connecting pin 38a does not interfere with the swinging arm holder 22. Stated otherwise, swinging of the arm holder 22, or in other words, movement of the movable gun arm 14, is not impeded by the first connecting pin 38a.

In the arm holder of the welding gun according to the conventional technique, through openings are not formed in the region where the movable gun arm is attached. Thus, in the case that a connecting pin is disposed on the trajectory through which the arm holder swings, swinging thereof is obstructed by interference of the arm holder with the connecting pin. In order to avoid this situation, the upper sides of the first retaining member and the second retaining member are not connected together. With such a retaining unit, the rigidity thereof is relatively small, and it is difficult to retain the stationary gun arm and the movable gun arm, which are elongated and large in weight.

In addition, according to the conventional technique, since through openings are not formed in the arm holder, the retaining unit increases in weight.

In contrast thereto, with the welding gun 10 according to the present embodiment, a structure is adopted in which the upper sides of the first retaining member 32 and the second retaining member 34 are connected by the first connecting pin 38a and the second connecting pin 38b, and together therewith, the through openings 86a, 86b are formed in the arm holder 22, and the first connecting pin 38a passes through the through openings 86a, 86b. Consequently, the rigidity upwardly of the first retaining member 32 and the second retaining member 34 can be assured, while also enabling the arm holder 22 (movable gun arm 14) to swing.

Next, under an action of the transformer 30, a welding current is energized between the first electrode tip 18 and the second electrode tip 20. The welding current passes through the interiors of the members to be welded W1, W2, whereby a rise in temperature takes place at a contact interface between the members to be welded W1, W2, and melting occurs. Thereafter, when energizing of the welding current is stopped, the molten material becomes solidified, together with the members to be welded W1, W2 becoming integrally joined through solidified or congealed matter therein.

Next, the servo motor is re-energized. Rotational motion of the servo motor at this time is converted into forward (rising) movement of the rod in the axial direction through the ball screw.

Along therewith, the first roller retaining shaft 26a to which the rod is connected is pressed upwardly. Consequently, the arm holder 22 is swung so as to face upward, and in following relation, the movable gun arm 14 separates away from the stationary gun arm 12. At this time, the first roller 88a and the second roller 88b move upwardly while being guided within the first guide grooves 56, and together therewith, the third roller 90a and the fourth roller 90b move upwardly while being guided within the second guide grooves 58. Finally, the second electrode tip 20 provided on the distal end of the movable gun arm 14 separates away from the upper surface of the member to be welded W2, together with the welding gun 10 being placed in an opened state.

During this time, the angle of rotation of the servo motor is detected by the encoder 28 in the same manner as discussed above. When the angle of rotation arrives at a preset angle, and more specifically, when the movable gun arm 14 swings to a predetermined angle, the servo motor and the ball screw are stopped. Of course, even during such swinging, the first connecting pin 38a does not interfere with the swinging arm holder 22.

When the member to be welded occupies a small surface area, the stationary gun arm 12 and the movable gun arm 14 may be exchanged with ones having shorter dimensions. In the retaining unit 16, since rigidity can be assured commensurate with retention of the elongated form and large weight of the stationary gun arm 12 and the movable gun arm 14, it is easily possible to retain a shorter-dimensioned and lighter weight stationary gun arm and movable gun arm.

In this manner, by exchanging the stationary gun arm 12 and the movable gun arm 14, the welding gun 10 can be made to correspond with the size of the member to be welded. Stated otherwise, the welding gun 10 is superior in versatility.

The present invention is not particularly limited to the embodiment described above, and various modifications can be adopted therein without deviating from the essential gist of the present invention.

For example, only the vicinities of the first connecting pin holes 60a, the second connecting pin holes 60b, the first guide grooves 56, the second guide grooves 58, and the bolt holes 50 may be formed separately as thick-walled regions.

Further, the first roller retaining shaft 26a and the second roller retaining shaft 26b need not rotate, and only the first roller 88a, the second roller 88b, the third roller 90a, and the fourth roller 90b may be rotated.

Furthermore, the first guide grooves 56 and the second guide grooves 58 may be linked or joined together, thereby forming a single guide groove.

The invention claimed is:

1. A welding gun comprising:
   a retaining unit that retains a stationary gun arm; and
   a movable gun arm configured to approach toward and separate away from the stationary gun arm,
   wherein the retaining unit comprises a first retaining member and a second retaining member sandwiching an arm holder therebetween, the arm holder configured to retain the movable gun arm, and rolling members sitting on the arm holder, the rolling members configured to roll as the moveable gun arm approaches toward or separates away from the stationary gun arm,
   wherein, in each of the first retaining member and the second retaining member along a thickness direction thereof, there are formed retaining holes configured to retain the stationary gun arm, a guide groove configured to guide the rolling members therein, connecting member insertion holes in which connecting members configured to connect the first retaining member and the second retaining member are inserted, and a retained member insertion hole in which a retained member is inserted, the retained member retained by a transport apparatus configured to move the retaining unit to a welding operation location,
   wherein the retaining holes, the guide groove, the connecting member insertion holes, and the retained member insertion hole are formed in thick-walled regions having a greater thickness than other regions where the retaining holes, the guide groove, the connecting member insertion holes, and the retained member insertion hole are not formed, and
   wherein at least two of the connecting member insertion holes are arranged across from the guide groove, together with the connecting member that is inserted into one of the connecting members passing through a through hole that is formed to penetrate along a thickness direction of the arm holder.

2. The welding gun according to claim 1, wherein the thick-walled regions having the retaining holes, the guide groove, and the connecting member insertion holes are formed continuously.

* * * * *